Oct. 14, 1969 R. W. HATCH, JR., ET AL 3,472,259
FLUID INFORMATION SYSTEM
Filed June 23, 1967 16 Sheets-Sheet 1
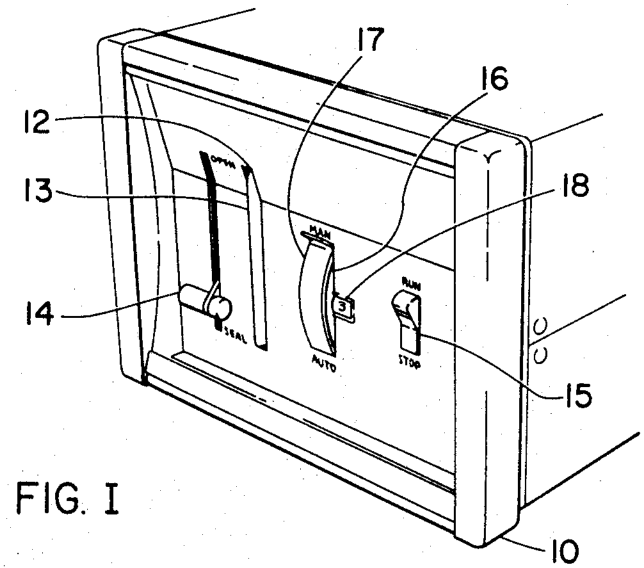
FIG. I
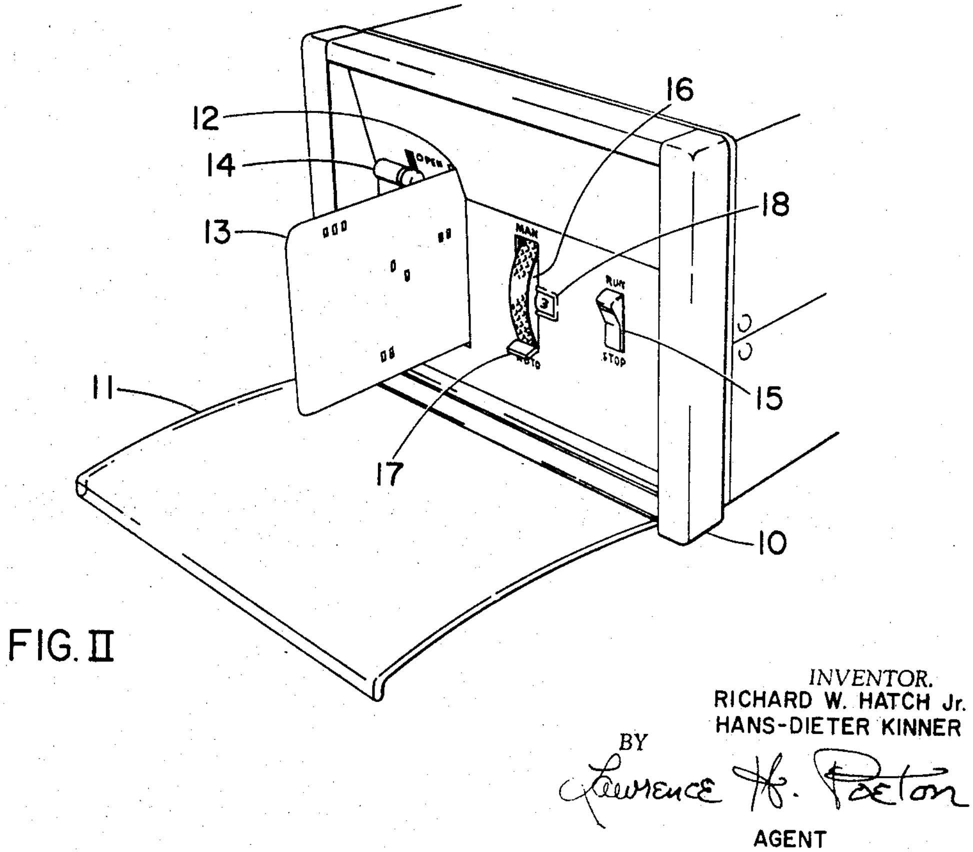
FIG. II
INVENTOR.
RICHARD W. HATCH Jr.
HANS-DIETER KINNER
BY Lawrence H. Paxton
AGENT

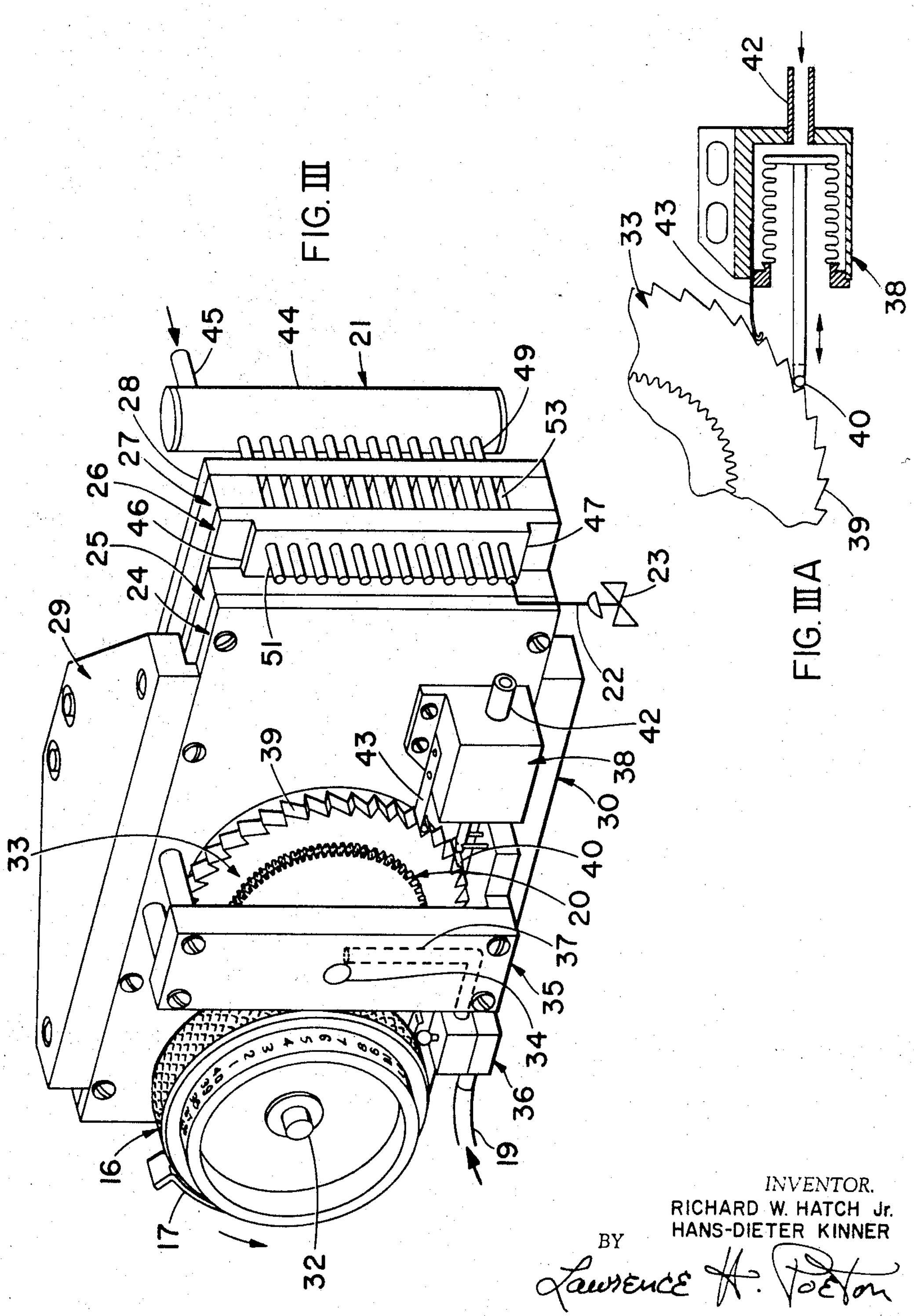
FIG. III, FIG. III A
INVENTOR.
RICHARD W. HATCH Jr.
HANS-DIETER KINNER
BY
Lawrence H. Poeton
AGENT

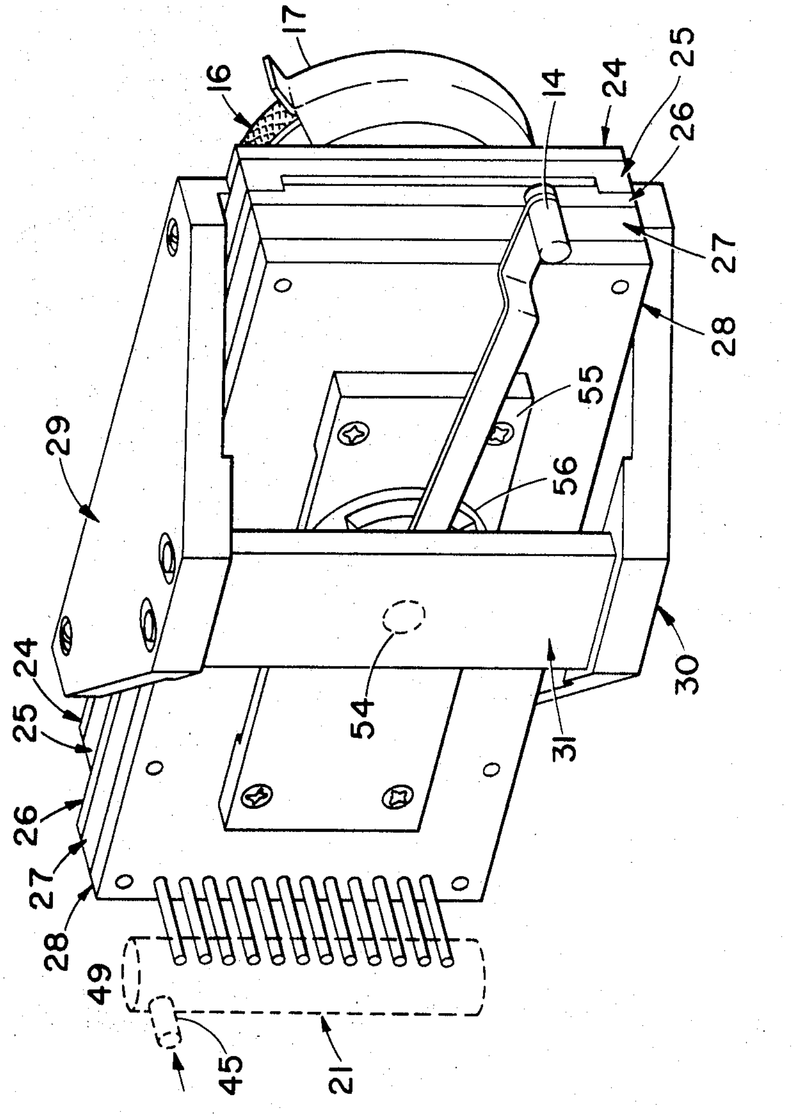
FIG. IV
INVENTOR.
RICHARD W. HATCH Jr.
HANS-DIETER KINNER
BY Lawrence H. Poeton
AGENT

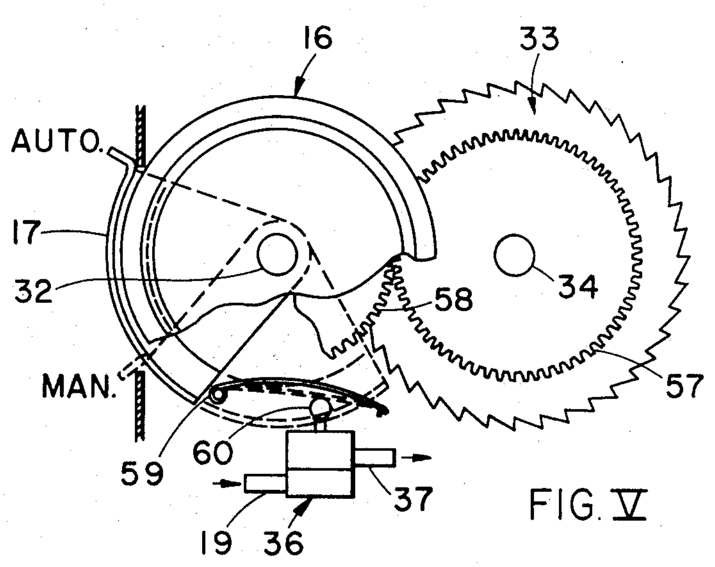
FIG. V
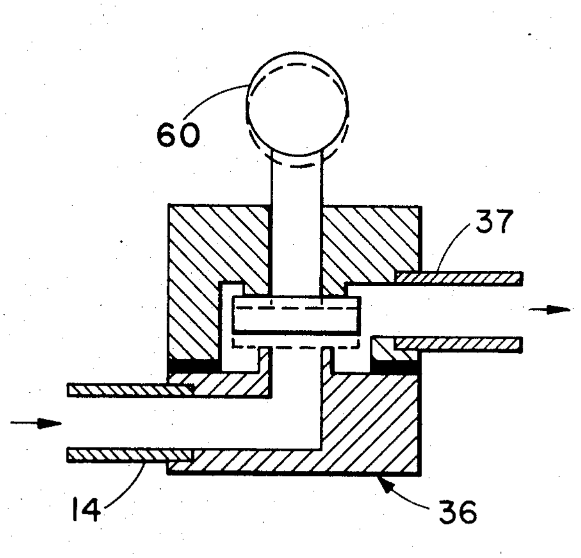
FIG. VA
INVENTOR.
RICHARD W. HATCH Jr.
HANS-DIETER KINNER
BY
Lawrence H. Poeton
AGENT Oct. 14, 1969 R. W. HATCH, JR., ET AL 3,472,259
FLUID INFORMATION SYSTEM
Filed June 23, 1967 16 Sheets-Sheet 5
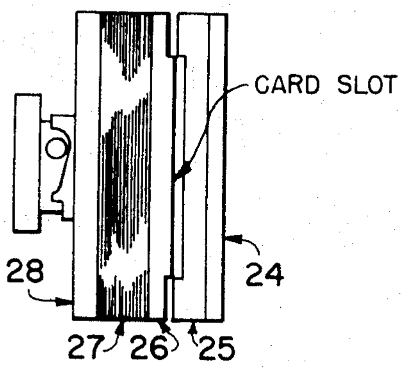
FIG. VI
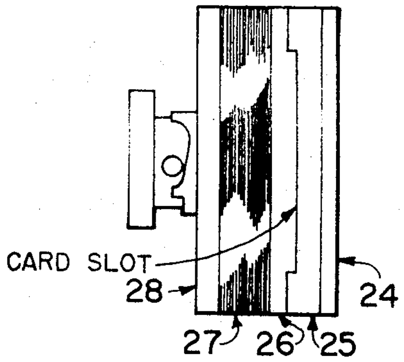
FIG. VII
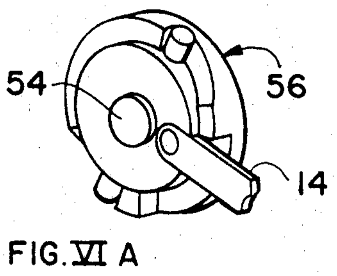
FIG. VI A
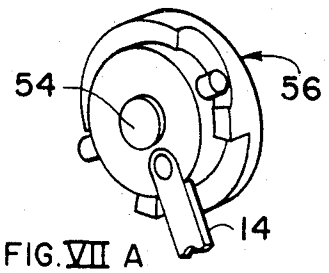
FIG. VII A
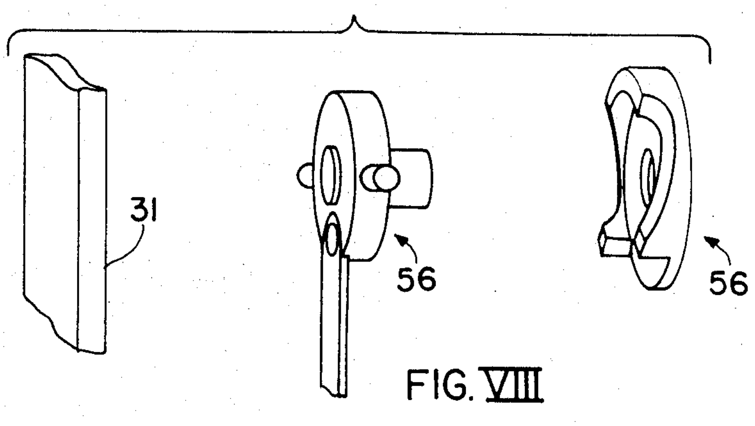
FIG. VIII
INVENTOR.
RICHARD W. HATCH Jr.
HANS-DIETER KINNER
BY Lawrence H. Poston
AGENT

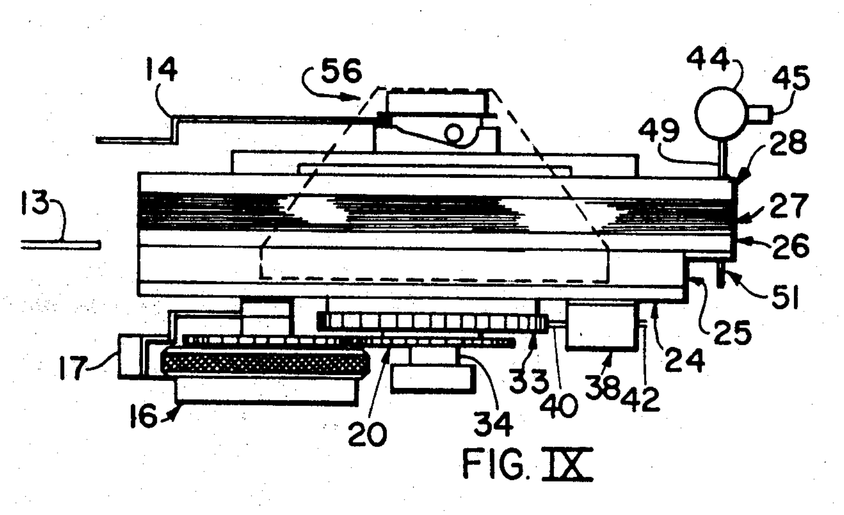
FIG. IX
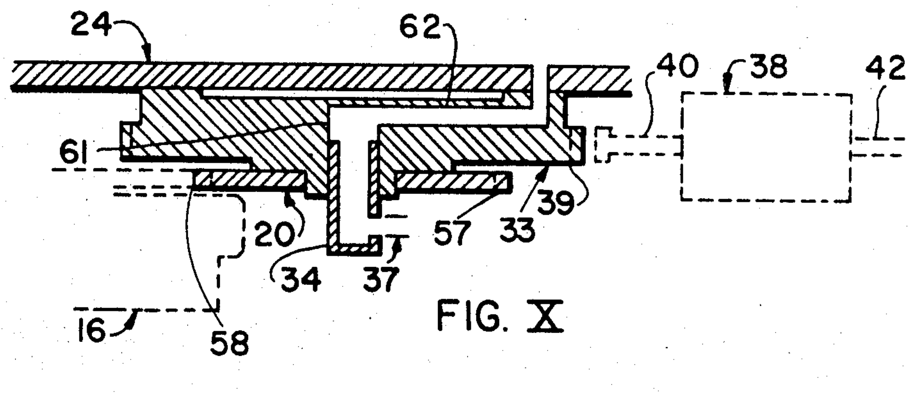
FIG. X
INVENTOR.
RICHARD W. HATCH Jr.
HANS-DIETER KINNER
BY
Lawrence H. Poston
AGENT

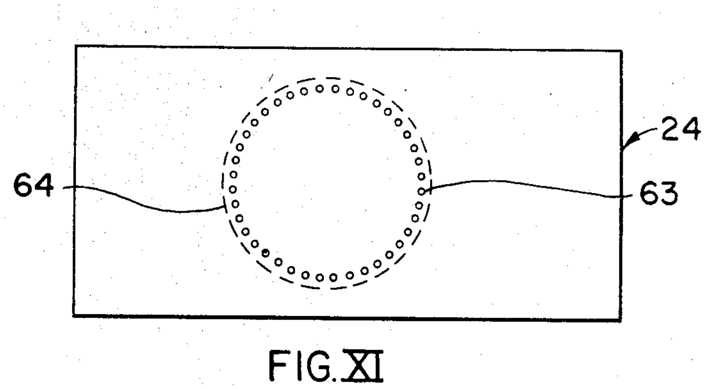
FIG. XI
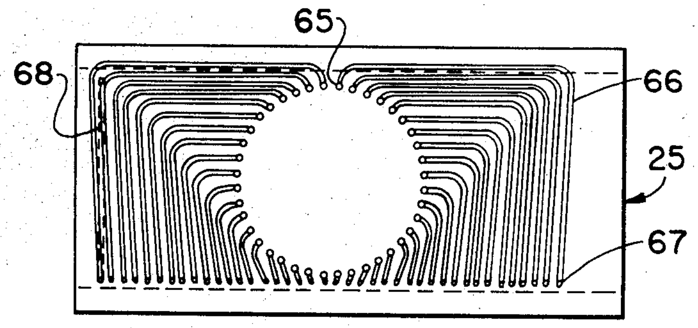
FIG. XII
FIG. XIII A
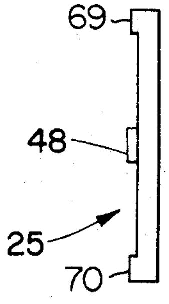
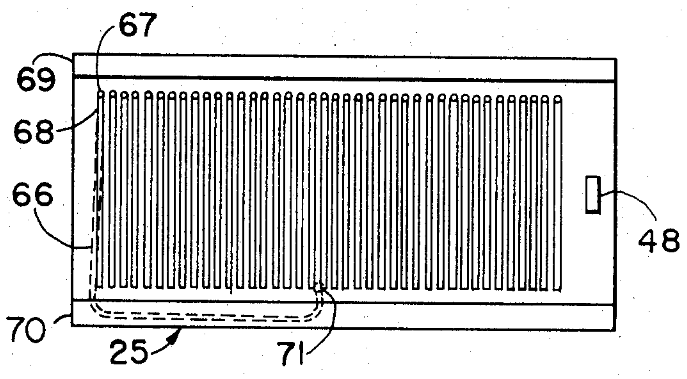
FIG. XIII
INVENTOR.
RICHARD W. HATCH Jr.
HANS-DIETER KINNER
BY Lawrence H. Poston
AGENT

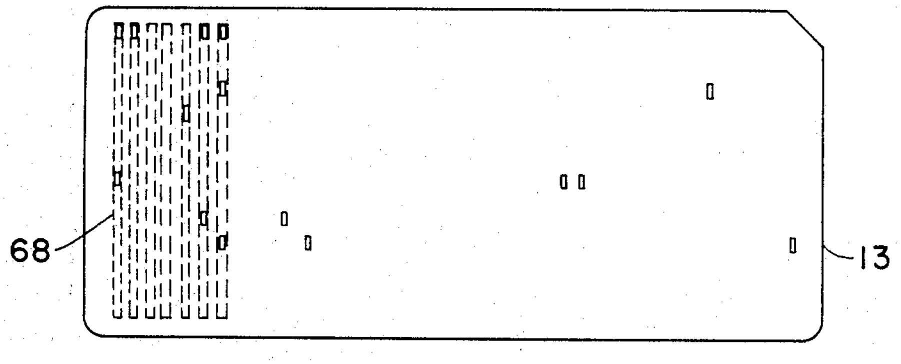
FIG. XIV
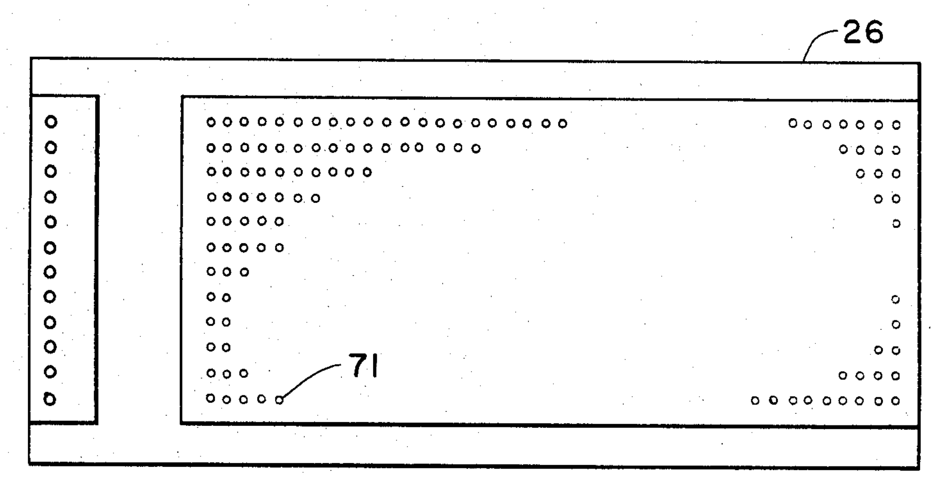
FIG. XV
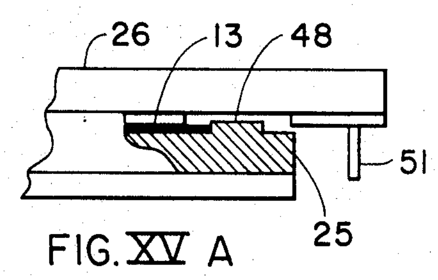
FIG. XV A
INVENTOR.
RICHARD W. HATCH Jr.
HANS-DIETER KINNER
BY Lawrence H. Poeton
AGENT Oct. 14, 1969 R. W. HATCH, JR., ET AL 3,472,259
FLUID INFORMATION SYSTEM
Filed June 23, 1967 16 Sheets-Sheet 9
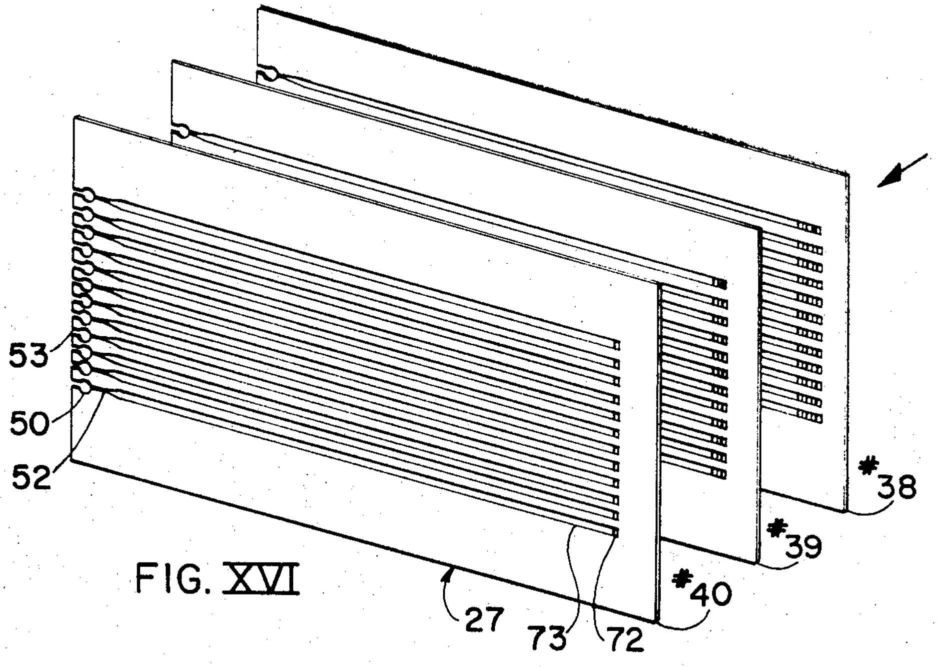
FIG. XVI
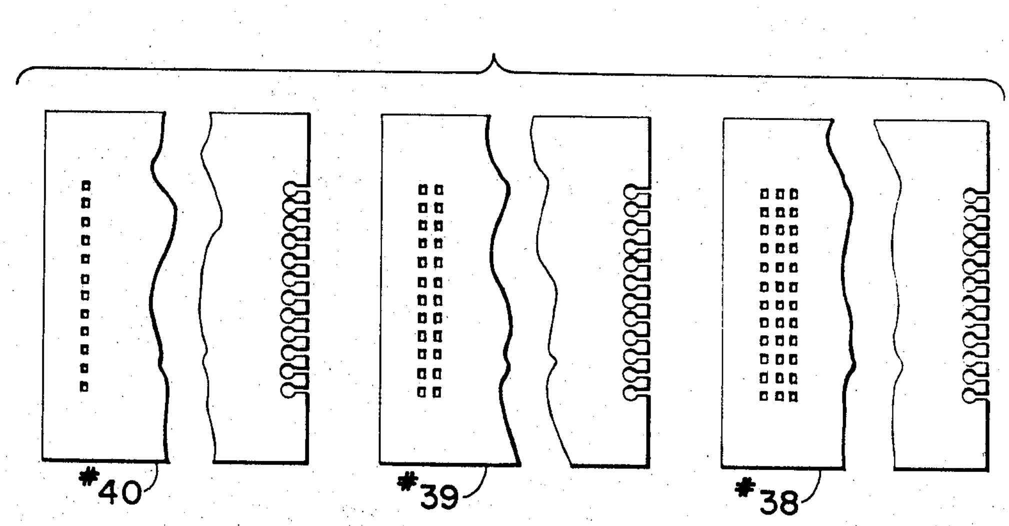
FIG. XVII
INVENTOR.
RICHARD W. HATCH Jr.
HANS-DIETER KINNER
BY Lawrence H. Poston
AGENT

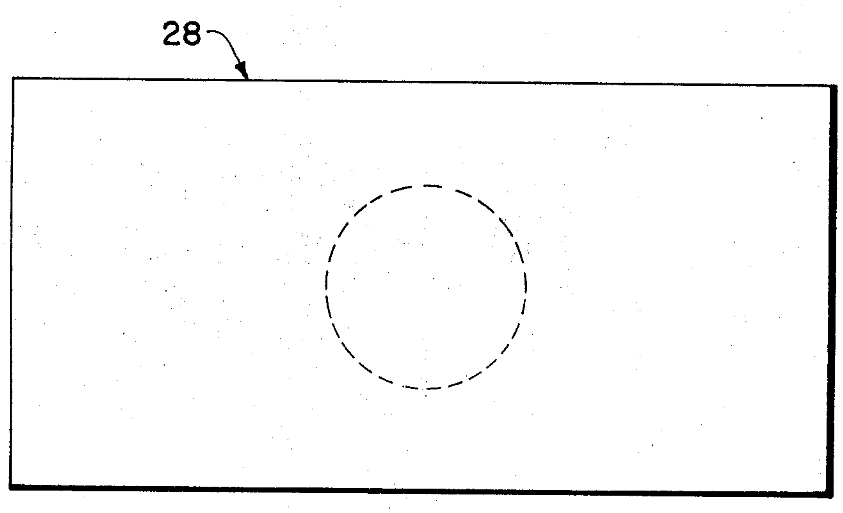
FIG. XVIII
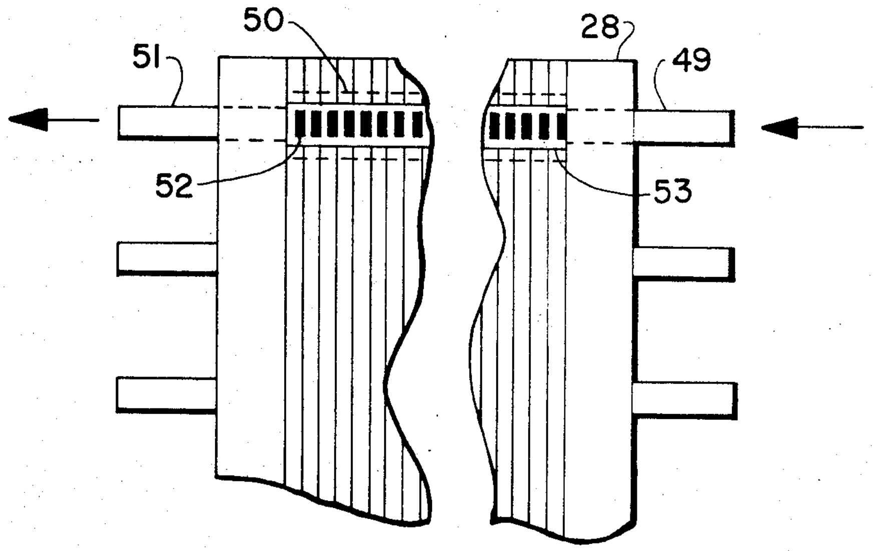
FIG. XIX
INVENTOR.
RICHARD W. HATCH Jr.
HANS-DIETER KINNER
BY Lawrence H. Poeton
AGENT FLUID INFORMATION SYSTEM
Filed June 23, 1967 16 Sheets-Sheet 11
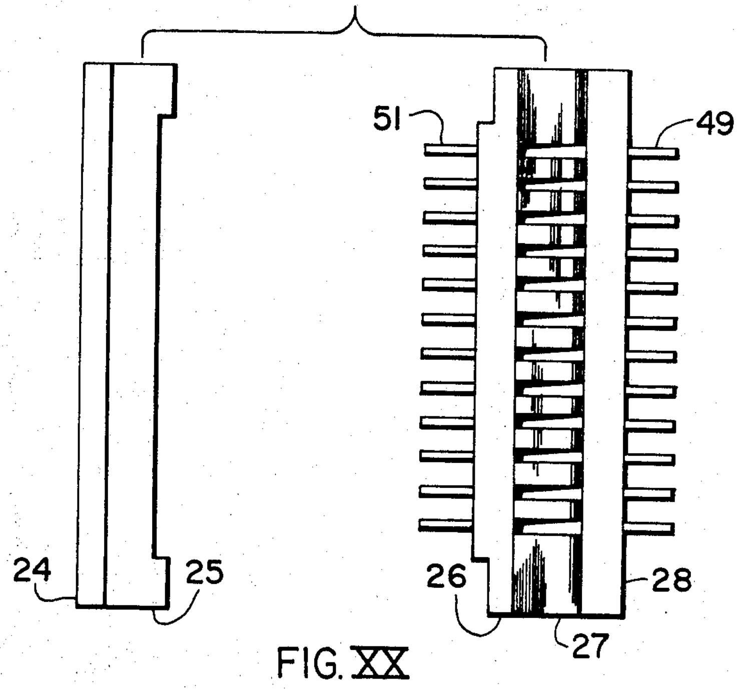
FIG. XX
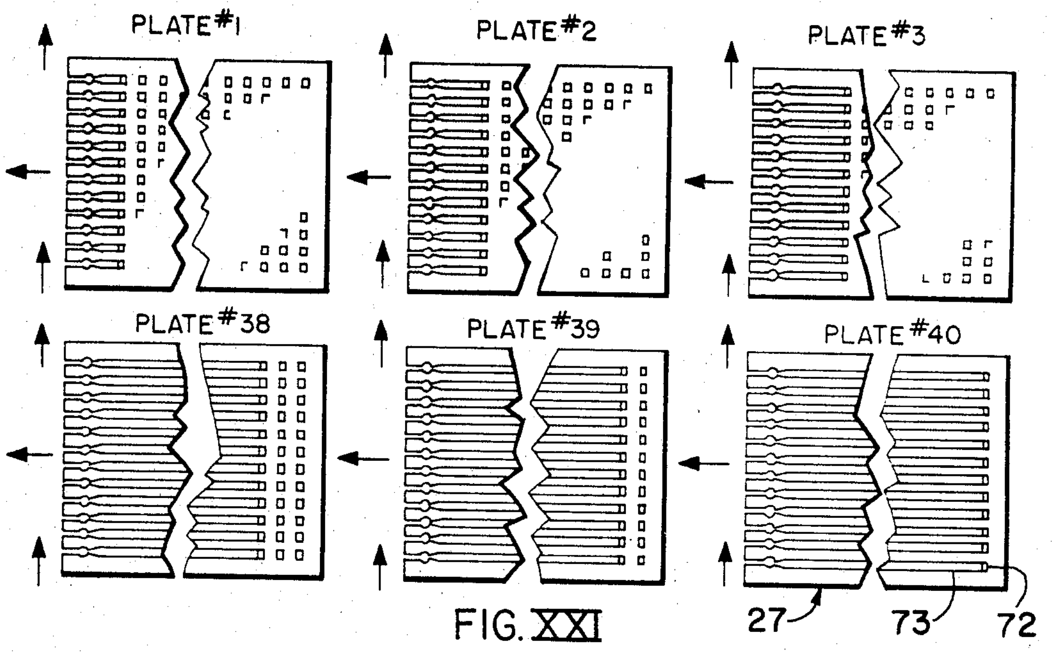
FIG. XXI
INVENTOR.
RICHARD W. HATCH Jr.
HANS-DIETER KINNER
BY
Lawrence H. Poeton
AGENT

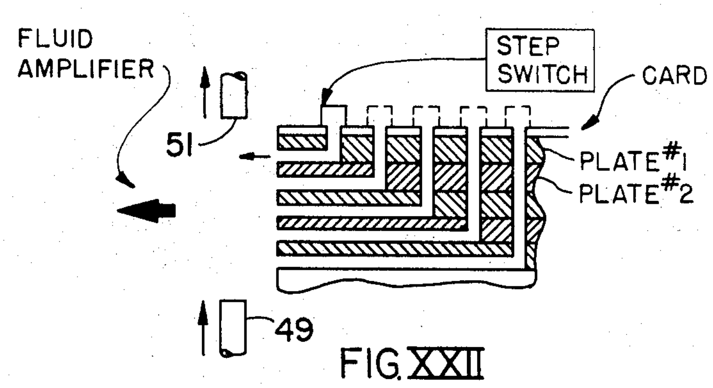
FIG. XXII
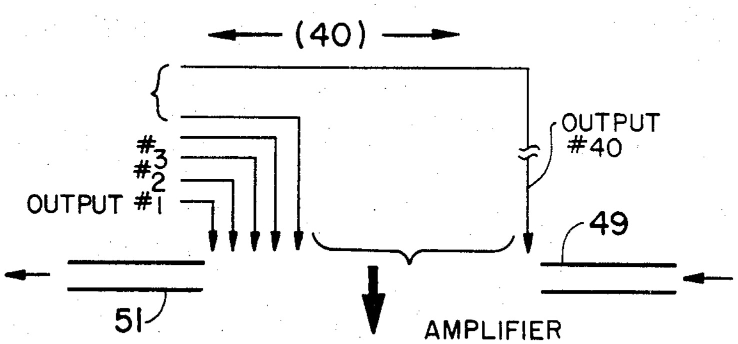
FIG. XXIII
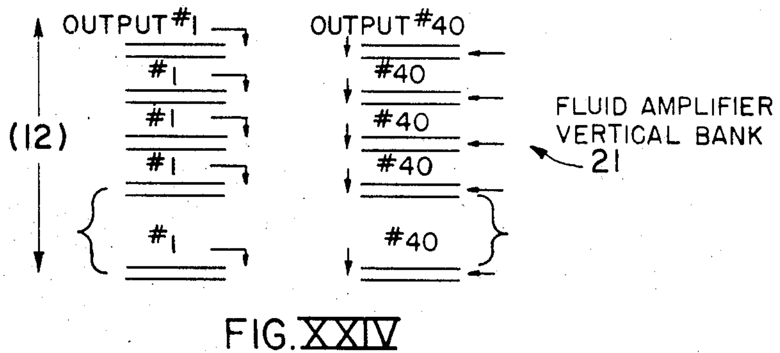
FIG. XXIV
INVENTOR.
RICHARD W. HATCH Jr.
HANS-DIETER KINNER
BY Lawrence H. Poston
AGENT

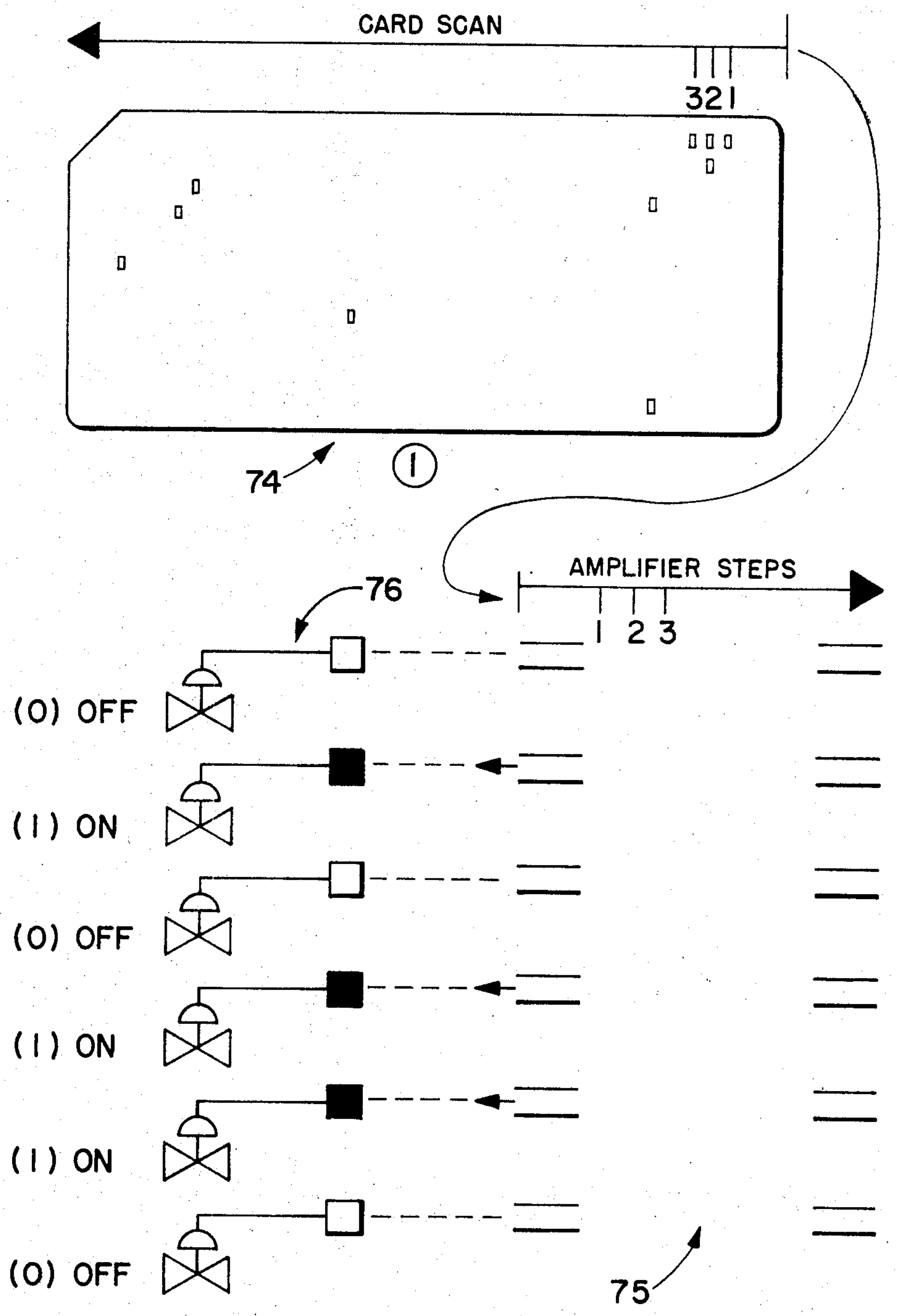
FIG XXV
INVENTOR.
RICHARD W. HATCH Jr.
HANS-DIETER KINNER
BY
Laurence H. Poeton
AGENT

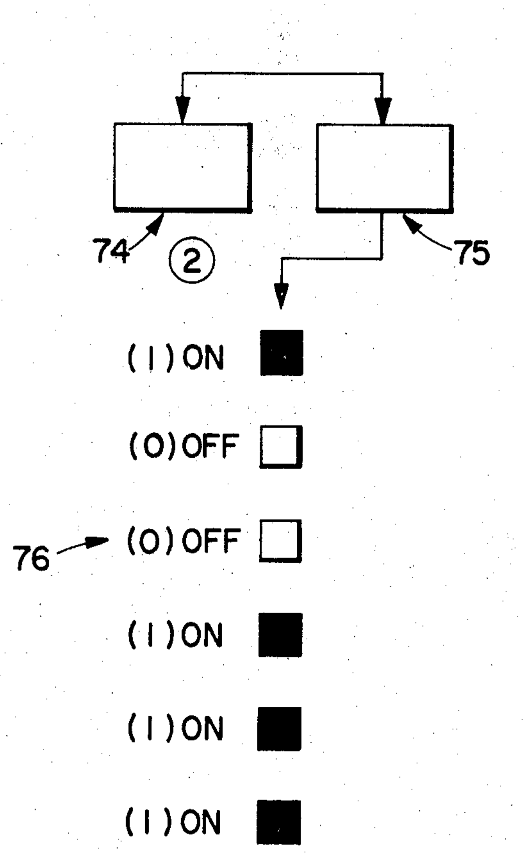
FIG. XXV A
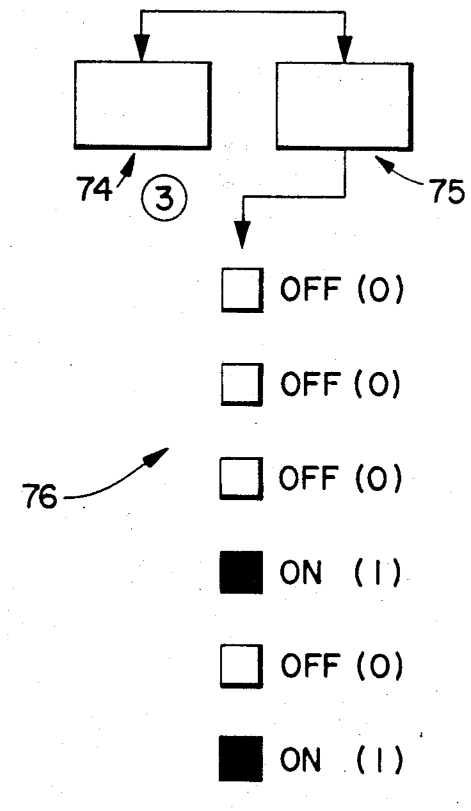
FIG. XXV B
INVENTOR.
RICHARD W. HATCH Jr.
HANS-DIETER KINNER
BY Lawrence H. Poeton
AGENT

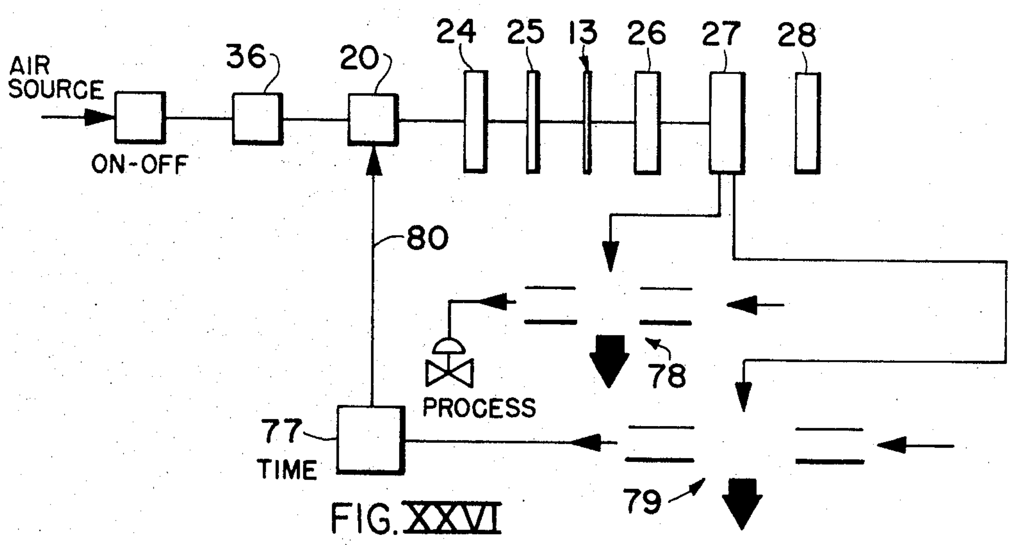
FIG. XXVI
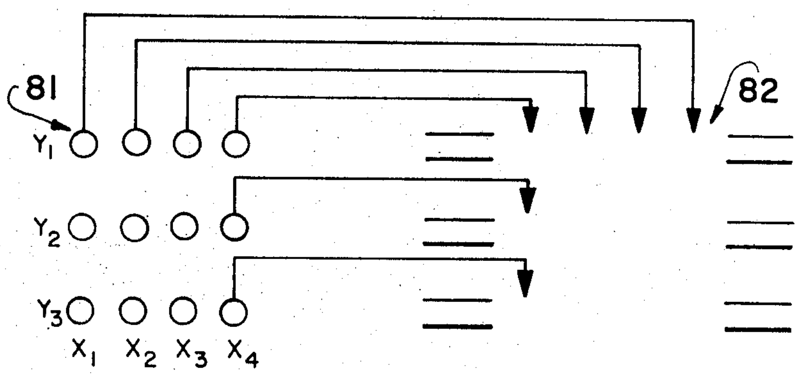
FIG. XXVII
INVENTOR.
RICHARD W. HATCH Jr.
HANS-DIETER KINNER
BY Lawrence H. Poston
AGENT

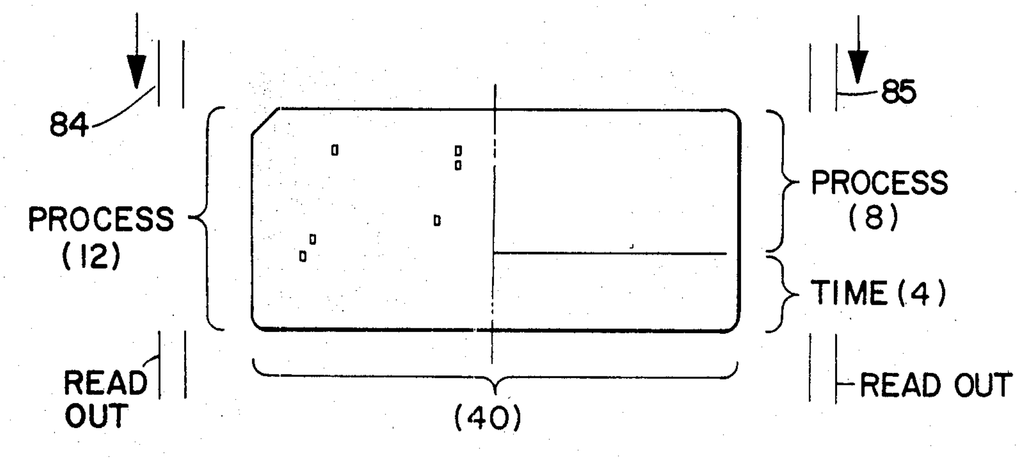
FIG. XXVIII
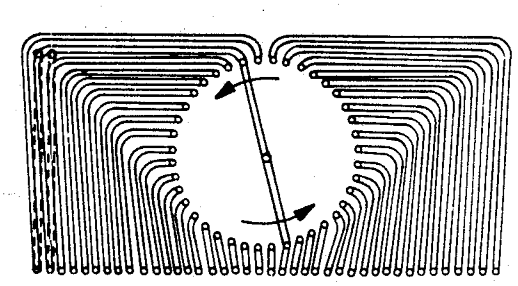
FIG. XXIX
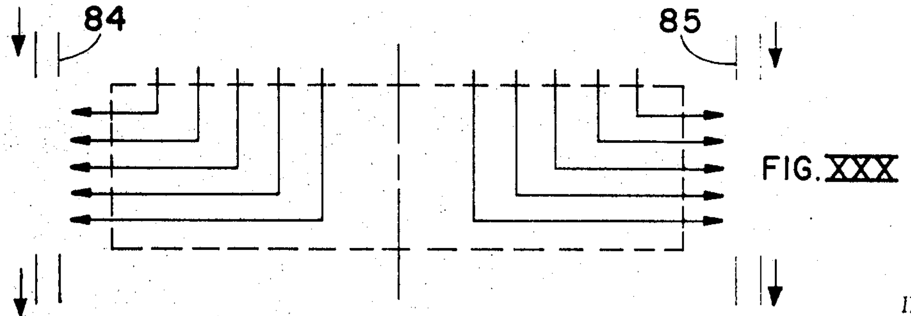
FIG. XXX
INVENTOR.
RICHARD W. HATCH JR.
HANS-DIETER KINNER
BY
Lawrence H. Poston
AGENT United States Patent Office 3,472,259

Patented Oct. 14, 1969

3,472,259

FLUID INFORMATION SYSTEM

Richard W. Hatch, Jr., Norwell, and Hans-Dieter Kinner, Attleboro, Mass., assignors to The Foxboro Company, Foxboro, Mass., a corporation of Massachusetts Filed June 23, 1967, Ser. No. 648,458
Int. Cl. F15c *1/08, 1/12, 1/14*
U.S. Cl. 137—81.5 10 Claims

ABSTRACT OF THE DISCLOSURE

A fluid information system of the nature of a punch-card reader, used for example as a programmer for controlling industrial process parameters, wherein an information matrix of fluid passages is held fixed with respect to a fluid output system of readout passages, each of the readout passages being individual to one of said matrix passages on an isolated gating basis, without feedback and without cross-contamination between said readout passages, means responsive to output signals from said output passages for producing operating signals representative of the information in said information matrix, and means for fluid scanning said information matrix to initiate said output signals by directing fluid through said passages in said information matrix.

This invention relates to information devices such as programmers for controlling industrial processes. It has particular reference to card reader types of programmers.

Such devices in the past have been limited in various ways. They have moving parts which require precision structure and operation such as rotating information drums or travelling readout heads. Some electronic devices are very fast, but complicated, expensive, and subject to electronic feedback and cross-talk unless expensively and complicatedly protected against such difficulties.

Many industrial processes may be controlled by systems that are reasonably fast. This invention provides fluid information systems which are readily capable of sufficient speed of operation to very efficiently control industrial processes and other operational functions with similar speed requirements.

This invention, further, dispenses with moving parts such as tapes, rotating drums, and moving pick-up heads. As an example this invention provides an information system with none of such movements. The information matrix of this invention, such as a standard punch-card is, in operation, held fixed between a fixed fluid input body and a fixed fluid output body.

This invention differs from conventional punch-card readers which are limited to a single statement per card.

The system of this invention may utilize none, any, or all of the potential information items on a single card, thereby greatly increasing the information which can be stored on a single card, a substantial increase in informational density.

The system of this invention is based on sequential readout of a single punch-card, or its equivalent. It may be manually inserted and removed.

Conventional card readers read a multiplicity of cards, each with a single information statement, with automatic card handling devices. With this invention, entire industrial processes may be accomplished with a single punch-card.

The fluid input to the system of this invention is successively directed to a series of fixed input passages distributed across the face of the punch-card. This successive direction may be accomplished with no moving parts by a structure exemplified by the fluid logic ring counter system of U.S. Patent No. 3,251,547, Hatch, issued May 17, 1966. It may also be accomplished by a simple rotational arrangement disclosed hereinafter, which is removed from immediate association with the punch-card and thus obviates the prior art difficulties with moving parts.

Readout of this invention is provided by a fixed series of independent passages, one for each of the possible information openings in the punch-card. Thus, there can be no cross-contamination of output signals. Since signals in these output passages are applied to fluid amplifiers as controls therefor, there can be no feedback.

The nature of this fluid system is such as to permit the use of small fluid passgaes. Accordingly the unique system of output passage plates of this invention is made possible, and a large complement of the possible information units in a single conventional punch-card can be used. This may be in the order of forty potential holes in a card in one direction and twelve potential holes in another direction. These directions are usually respectively horizontal and vertical.

As a measure of the compact utility of the system according to this invention, the horizontal rows of forty card holes are provided with a sandwich of forty individual output passage plates, all forty of any one row being applied to a single fluid amplifier as controls therefor, one at a time, as the punch-card is scanned by the input fluid stream. Further, each of the holes in any one of the vertical columns of twelve card holes are provided, at any one scan time, with a different fluid amplifier to be controlled.

These uniquely simple fixed structure combinations provided a large number of possible signals or signal combinations in a compact assembly. The output fluid amplifiers to which these signals are directed may be diffusion amplifiers which provide logic outputs of 0 and 1 from the same output passage. Thus the output signals can be separately utilized, or joined in binary code groupings, as desired.

A useful combination based on a system according to this invention provides an operational closed loop function wherein the scanning steps of the input to the punch-card are initiated when a selected parameter value is achieved as a result of the operational effect of the output of the card reader.

For example, time output pulses may be applied to a timing unit, and when the predetermined time has elapsed, a signal is automatically directed to the card reader fluid input system, to produce the next scanning step with respect to the punch-card.

Instead of time, other parameters or combinations thereof may be used to initiate the next scanning step. These may be for example, temperature or flow, or the like, alone, in combination, or in combination with time.

The scanning steps may be automatic or manual, and special means is provided to prevent unwanted input fluid flow during manual adjustments to different scanning stations.

Means is provided for receiving, aligning and clamping a punch-card into operationally fixed relation with respect to the fluid input and output devices of this invention.

The punch-card system according to this invention provides an information system of large capacity and great flexibility which is compact, simple in structural concept, and capable of industrial process control in a new and highly useful manner. In sum:

This invention has a no-moving-parts structure in the sense that the punch card does not move, the fluid scan input passages are held fixed with respect to the punch card, and the fluid output signal passages are held fixed with respect to the punch card. The output passages are individual to the possible holes in the card, and this, plus the use of fluid amplifiers in the output, provides the desirable conditions of no feedback, and no cross-over signal effects between the output signals;

This invention provides a unique system of X, Y information matrix combination with X, Y related application to and combination with a series of fluid amplifiers in the output of the system; and This invention further provides a closed loop system wherein input fluid scanning action is controlled by feedback from signals through the punch card itself.

Other objects and advantages of this invention will be in part apparent and in part pointed out hereinafter and in the accompanying drawings, wherein:

FIGURES I and II are views of the front of a housing for a device according to this invention, illustrating the operating panel, and how the punch-card is inserted;

FIGURE III is a perspective of an assembly according to this invention, from the rear, on the fluid input side;

FIGURE III–A is a detail of the scanner actuator of FIGURE III;

FIGURE IV is another perspective of the assembly of FIGURE III, from the front, on the punch-card clamp side;

FIGURE V is a schematic of a portion of FIGURE III, illustrating the automatic-manual mechanism with respect to the scanning step wheel;

FIGURE V–A is a detail of the input fluid shut-off operable by structure shown in FIGURE V;

FIGURES VI, VI–A, VII, VII–A and VIII are details of the punch card clamping apparatus, as seen in assembly in FIGURE IV;

FIGURE IX is a schematic of the top of the structure of FIGURE III and IV, without the support structure;

FIGURES X through XVIII schematically illustrate the parts of the structure of FIGURE IX, taken in order in FIGURE IX, from the bottom of FIGURE IX up;

FIGURE XIX is a fragmentary enlargement of the portion of the fluid amplifier area at the right hand end of FIGURE III;

FIGURE XX is an exploded view showing of a portion of the right hand end of FIGURE III, showing the bank of fluid amplifiers, and the structure units between which the punch-card is located, this view from the rear. See FIGURES III, IV, V, and VII for this feature from the front of the device;

FIGURES XXI and XXII further illustrate the details of the sandwich sub-assembly of forty individual readout output plates of FIGURE XVI;

FIGURE XXIII schematically illustrates the application arrangement of forty control signals, one from each FIGURE XVI plate and one at a time, to a single diffusion fluid amplifier;

FIGURE XXIV schematically illustrates the application arrangement of twelve (potentially) control signals, all from the same one of the FIGURE XVI plates, one signal to each of the fluid amplifiers;

FIGURE XXV schematically illustrates the scan steps along the punch card with simultaneous control signal movement along the open flow path of the fluid amplifiers, resulting in varying combinations of the amplifier output vertical line of (potentially 12) signals as in FIGURES XXV, XXV–A and XXV–B;

FIGURE XXVI is a schematic-line showing of the overall operation of a system according to this invention;

FIGURE XXVII is a conceptual schematic of an X, Y matrix consideration of information handling according to this invention; and FIGURES XXVIII, XXIX, and XXX present a conceptual series of an alternative system according to this invention in which the information matrix is effectively a potential of 40 card holes in one direction and 24 in another.

In FIGURE I of the drawings, an instrument housing 10 is provided for containing the structure of this invention. Its operating panel is provided with an access door 11, of translucent plastic, hinged horizontally across the bottom, and formed in a curved planar shape. This is a substantial aid in reducing reflections to increase visibility of the panel while providing protection against dirt, dust, impact, or accidental operation of the controls on the panel.

A vertical slot 12 is provided for insertion and removal of a punch-card 13, with a lever 14 provided for vertical movement to open and close the card receiving slot in the instrument itself within the housing. The slot 12 in the panel, remains open at all times. Another control on the panel is a main on-off switch 15 for controlling the main line of power fluid input to the device. Further, a manual, scan stepping wheel 16 extends out through the panel, with a fluid switch lever 17 associated therewith for closing off the main fluid input temporarily, while manual change of scanning steps is accomplished. A number scan step indicator 18 is provided adjacent the wheel 15. As will be shown hereinafter, manual rotation of the stepping wheel 16 provides scanning steps as desired. These may be one-by-one, or steps may be passed over.

Thus the FIGURE I showing is with the punch-card fully inserted, the lever 14 is down in the (punch-card) seal position, and the door 11 is closed.

In FIGURE II, the punch card 13 is shown partly removed, the lever 14 is up in the open position, and the door 11 is open.

In consideration of FIGURE III, the operation of the system, generally stated, comprises a main fluid power input 19, usually air, to an index wheel 20, from which the input fluid is selectively directed through one side of the device to and through the punch card as holes therein are provided, through passages in the other side of the device, these passages right angling and directing fluid signals therein to a vertical bank of fluid diffusion amplifiers indicated at 21 as the right end portion of FIGURE III. The outputs of these amplifiers is forward out of the drawing, as indicated by one output at 22, leading to a symbolic control valve at 23.

The structure of FIGURE III is mainly in the form of a sandwich of five major units, separable as in FIGURES VI and VII to receive the punch card. On the FIGURE III front side there are two major plates 24 and 25. These are fixed together and do not move within the overall structure. On the FIGURE III back side, there are three major plate units 26, 27 and 28. These are fixed together and move as a single body within the overall structure to provide the card receiving and clamping function shown in FIGURES VI, VII, and FIGURE XX. In FIGURE IV the end division between plates 25 and 26 is a double line indicating a chamfer to aid the insertion of a punch-card. These major units are spring biased apart and are clamped together by cam action against the spring bias, to hold the punch-card. Pin and hole guidance is provided between the major units.

As in FIGURES III and IV a heavy support framework is provided in the form of a top cross plate 29, a bottom cross plate 30, and the FIGURE IV vertical bar 31. The plates 29 and 30 are secured to the top and bottom, respectively, FIGURE III, of the fixed sandwich unit, plates 24 and 25. The plates 29 and 30 are undercut and overcut respectively to provide the top and bottom frame clearance necessary to the punch-card receiving and clamping unit movement of the body assembly comprising plate units 26, 27 and 28.

In FIGURE III, the scan stepping manual adjust wheel 16 and the fluid switch lever 17 associated therewith are both mounted for rotation on a shaft 32, which in turn is mounted on the sandwich plate 24 which also serves as one of the vertical supports of the overall support frame.

Another major assembly mounted on the sandwich plate 24 is the scan stepping wheel 33 which is side held against the sandwich plate 24 in rotary sealing contact therewith. The wheel 33 is rotatably mounted on a support shaft 34 in a support frame 35 which in turn is mounted on the sandwich plate 24 in the form of a bridge over the scan stepping wheel 33.

Further in FIGURE III, in the main fluid input line 19 is a shut-off unit 36 with the line 19 as input, and an output to the stepping wheel 33 through the support 35 as indicated by dotted line 37. The shut-off unit 36 is further shown in FIGURE V and detailed in FIGURE V–A.

Also in FIGURE III, mounted on the sandwich plate 24, is a scan stepping automatic drive unit 38. This unit receives signals indirectly as will be seen hereinafter, from the output of fluid amplifier(s) in the amplifier bank 21. An independent pulse source, not shown, may be used if desired. The scan drive unit 38 is detailed in FIGURE IIIA. The scan wheel 33 is provided with a toothed drive periphery 39 wherein the teeth are periodically individually engaged by a T bar 40 which is moved by a bellows 41 within the unit 38, as actuated by scan signals in an input 42. A ratcheting flat spring 43 is provided to engage the wheel 33 between the teeth to locate the wheel 33 at each scan step.

With respect to the fluid amplifier bank 21 a single, common source chamber 44 is provided, with a fluid power input 45 for supplying all of the fluid amplifiers.

It may be noted that the sandwich plate 26 is provided with shoulders 46 and 47 which act as assembly guides to match cooperating shelves on the sandwich plate 25. These shelves also vertically locate the punch-card. The punch-card is end-bottomed and lengthwise located in the device by a stop 48 on the sandwich plate 25, see FIGURES XIII and XV–A.

In FIGURE III, the bank of diffusion amplifiers 44 is a vertical array of twelve separate amplifiers, each supplied with power fluid, usually air, from the common source 44 by way of the common supply input 45. These are the usual fluid diffusion amplifiers, with a simple input pipe, a free flow open space, and an output pipe. Control signals are applied to flow in the open space, from the side.

Taking the top amplifier as an example, see FIGURE III and FIGURE XIX, fluid flow is into an input pipe 49, which leads through but not beyond, the sandwich plate 28. An open stream space, at 50, is then traversed by the fluid, and the fluid exits through output pipe 51. As control signals are applied from inside the sandwich unit 27, see control openings 52, FIGURE XIX, the free fluid stream is diffused and escapes through opening 53 to atmosphere. Thus a free flow with no control signal results in a fluid flow output from output pipe 51 giving in logic terms, ONE. The control signals are applied one at a time, and if one is applied there is no output from the pipe 51, giving in logic terms, ZERO. Thus each amplifier output is one or zero as desired. The vertical amplifier bank 21 may thus produce 12 separate logic signals, or they may be combined as desired, after exiting from the output pipes, such as at 51.

FIGURES IV, VI, VI–A, VII, VII–A, and VIII, illustrate the mechanim for opening and closing the two main sandwich plate units that receive and hold the punch card. These units comprise (1) sandwich plate units 26, 27 and 28 together, and (2) sandwich plate units 24 and 25 together. As in FIGURE IV the units 24 and 25 are mounted on the frame 29 through the unit 24 as an upright part of the frame. The sandwich units 26, 27 and 28 as a unit are spring biased against the frame upright 31 and located by means of a pin 54.

A cam plate 55 is secured to the sandwich plate 28 and a lever and cam assembly 56 is mounted on the cam plate 55 with the pin 54 as a brace and force member against the frame upright 31.

As the cam lever 14 is moved down, the cam action forces the two major units together against the spring bias. As the cam lever 14 is moved up, the cams allow the spring bias to again open up the punch-card receiving slot between the separable sandwich plate assemblies.

FIGURE V is a detail of part of the structure of FIGURE III. It shows the scan stepping wheel 33 with an integral smaller gear 57 (smaller than the peripheral gear with teeth 39), which is geared to the manual scan wheel with respect to peripheral gear teeth 58 thereon. Thus manual rotation of the wheel 16 indexes the scan wheel 33.

Also in FIGURE V, the main fluid input shut-off action is detailed. Through the clamping structure of FIGURE V–A, a leaf spring 59, FIGURE V, is able to shut-off the input by engaging the pin 60, when the fluid switch lever 17 is moved down to manual position. The spring 59 is cammed to the position shown by dotted lines and thus engages the pin 60.

Note FIGURES IX, X, XI, XII, XIII, XIV, XV, XV–A, XVI, XVII, and XVIII.

In these figures the sandwich plate units of FIGURE III are separately considered in terms of their individual structure and function, and in terms of their functions of combination.

In FIGURE IX an overall top view schematic is presented in which the various main sandwich units are shown, from the input scan index wheel 33 at the bottom of the drawing, to the cam mechanism 56 at the top of the drawing, and from the punch card 13 at the left of the drawing, ready for insertion, to the top of the bank of fluid amplifiers at the right of the drawing, as the fluid output of the sandwich structure.

FIGURE X is a cross-section of the fluid input scan index wheel 33 shown rotatably mounted on fixed pin 34, through which the input fluid is directed into a chamber 61. From the chamber 61 a radial passage 62 carries the input fluid sequentially to 40 holes one at a time, in the index plate 24, FIGURE XI, where these holes are shown in a circle 63. The wheel 33 is formed of a soft plastic and is in face seal rotary contact with the index plate 24 as indicated by dotted line 64.

FIGURES XII and XIII are front and rear views respectively of the scan step fluid distribution sandwich plate 25. In FIGURE XII, the ring of holes 65 matches up with the ring 63 of holes in the FIGURE XI index plate 24. Each of the holes 65 is provided with an individual curved slot as at 66 which is completed as an air passage by the engaging face of the FIGURE XI index plate 24. The FIGURE XII various passages 66 terminate in a row of holes 67 along the bottom of and through the distribution plate 25, which holes lead to individual vertical channels 68 in the rear face of the distribution plate 25. FIGURE XIII–A is a right end view of the plate 25.

It is the FIGURE XIII face of plate 25 which engages the input side of the punch-card 13, FIGURE XIV. The vertical slots 68 thus engage the punch-card in FIGURE XIV areas indicated by the dotted line 68.

Accordingly, from the FIGURE X input, at each scan station, air is passed through one hole 63 in the FIGURE XI plate, and through the corresponding holes 65 and 67 in the FIGURE XII plate, to exit as line areas 68 of fluid applied simultaneously over a single vertical line area of the FIGURE XIV card, as at 68. As the stepping scan function proceeds, the scan area moves across the card. According to the information matrix of holes in the card, on an X, Y basis air is passed through the card at any one time through whatever holes are in the card within the vertical area, 68, of the particular scan step then in operation.

The FIGURE XV readout plate 26, is provided with a readout opening 71 individual to each and every potential hole in the FIGURE XIV punch-card. Thus plate 26 has forty holes in each of 12 horizontal lines of holes.

Note that the punch card 13 is to be held between the fluid distribution plate 25, FIGURE XII, XIII, and the readout plate 26, FIGURE XV. The card is located vertically by shoulders 69 and 70, FIGURES XIII and XIII–A, on the distribution plate 25, and horizontally by butting against a block 48 on the distribution plate 25. The plates 25 and 26 are guided together by a pin and hole arrangement 71.

FIGURE XV–A illustrates the punch card up against the stop 48 and clamped between plates 25 and 26.

The next sandwich plate unit after and engaging the output plate 26 is the output passage unit 27. It is a sub-sandwich, within the main body, and comprises 40 output plates together as a unit. Three examples of individual output plates are shown in FIGURES XVI and XVII. FIGURE XVII shows the input sides of the plates of FIGURE XVI. Further illustrations are in FIGURES XXI and XXII.

Taken together, these forty plates provide a single output for each of the possible holes in the punchcard. These outputs are channels, made whole passages by the engaging wall of the next adjacent output plate in this output sandwich. Since these individual outputs carry fluid signals to fluid amplifiers independently the output is on a diode basis, with no feedback and no cross-contamination between output signals.

As in FIGURE XVI, plate No. 40 has a single vertical row of holes 72 therethrough. A horizontal channel 73 on the output side of the plate is provided for each of the holes 72. These individual channels are made full passages by engagement of this plate with the next adjacent plate, the end plate 28 of FIGURE XVIII. There are no holes in the end plate.

Each channel output passage 73 is constricted at its output end, at 52, see FIGURE XIX, to provide a control jet against the diffusion amplifier free flow through the opening 50, see FIGURE XIX. The opening 50 extends through all 40 plates. The diffusion amplifier opening to atmosphere 53 is also made up of a series of openings, one in each plate.

As in FIGURE XXI, each plate has its own number of vertical rows of 12 holes. With forty plates the rows decrease with the number of plates. Plate #1 has 39 rows, plate #2 has 38 rows and so on. Plate #39 has two rows and plate #40 has one row. Plate #1 is next to the readout plate, plate #2 next to plate #1, and so on.

In each plate, from its vertical row of holes nearest the output end of the plate, from each of the holes to the output, a horizontal channel output passage is provided, which is made a whole passage by the side surface of the next adjacent plate.

Accordingly, in plate #1, with 39 rows of vertical holes, the horizontal passages lengthwise of the plate from the holes at the left, are short. Thus there is in plate #1 a vertical series of short output passages. In any one plate there are passages from only one vertical row of holes. Thus as the plate number increases, the number of rows of vertical holes decreases, and the length of the horizontal output passages increases.

All the outputs of the horizontal passages from all the plates at any one vertical level, are applied one at a time in keeping with the step scanning of the punch card, to the same fluid diffusion amplifier as a control therefor.

A diffusion amplifier requires more control force at the output end of its free flow than at the input end. In this system, all the output signals leaving the punch-card have the same force. In plate #1 the output passage is short and essentially full force is applied to control the amplifier stream at its most difficult area. As the scan progresses through the output plates the output passages get longer, and the signal strength is correspondingly reduced. However, their points of application to the free flow stream of the fluid amplifier progress along that stream step by step to points step by step requiring less control force. Thus the system of this invention provides graduated force control signals matched to the graduated force necessary along the free force flow path of the fluid amplifier. See FIGURES XXII for structural, and FIGURE XXIII for schematic showing of this feature.

FIGURES XXII and XXIII further illustrate that while all 40 potential signal outputs of any one horizontal on the punch-card are applied, when called for, to a single diffusion fluid amplifier, this is done one at a time on a scan-step basis.

In FIGURE XXII for example, the scan function is at station #1 and the signal is applied to plate #1. In this situation, see FIGURE XXIV, the vertical bank of fluid amplifiers can only be actuated by signals from plate #1, depending on which punch-card openings are present in the first line scan area of the punch-card. In FIGURE XXIV all amplifiers are shown actuated.

Note that FIGURE XX is an output end view of the overall device, exploded to show the separation for punch-card insertion. See in this connection, FIGURES VI and VII.

FIGURES XXV, XXV–A, and XXV–B illustrate three scanning steps wherein different combinations of punch-card holes are encountered in the different vertical line area scan steps. It is illustrative only, and no attempt has been made to show punch-card holes matched with fluid amplifier bank output.

In FIGURE XXV a punch-card 74 is indicated as being scanned from right to left. At the same time, and as a consequence, the output signals are travelling from left to right along the free flow stream of each fluid amplifier in a vertical bank of amplifiers indicated at 75. In station #1 the output of the amplifier bank is indicated at 76 as binary off-on, one-zero.

FIGURE XXV–A illustrates scan step #2 and FIGURE XXV–B is scan step #3. Off, binary (0) means there is a control signal applied and there is no output from the amplifier. On, binary (1) means there is no control signal applied and there is an output from the amplifier. Thus the amplifier outputs may be applied together as logic groups or may be individually applied. In one form, the eight upper horizontal hole lines on a punch-card may be for process control use, and therefore the eight upper fluid amplifiers; and the lower four horizontal lines may be applied in binary fashion, to a timer.

In FIGURE XXVI a timer 77 is shown as a part of an outline schematic of operation of a system according to this invention. The point made by FIGURE XXVI is that this information system operates on a closed loop basis, and the scan steps are initiated by feedback from the output of the scan system. Starting with an air source at the left and proceeding through representations of the FIGURE III structure, one output signal is a process control as at 78. Another output signal at 79 activates a suitable timer 77 which, according to its setting, feeds back (80) the next scan step initiating signal after the planned time has elapsed.

The control parameter for the index scanner may be other than time. Level, flow, or others, or combinations of these may be used instead of the timer 77 to bring about a desired condition for initiating the next following scan step through the feedback 80, into, for example, the actuator 38 of FIGURE III. In fluid logic systems, with no moving parts, the mechanics of the FIGURE III wheel 33 may be eliminated. With a fluid logic ring counter, for example, successive outputs of successive stages can, through permanent connections, be applied sequentially to the fixed scanning areas such as 68 in FIGURES XIII and XIV. Such a counter is exemplified in U.S. Patent No. 3,251,547, Hatch, issued May 17, 1966.

FIGURE XXVII illustrates an X, Y matrix concept of this invention, wherein all punch-card holes in a single horizontal line 81 relate to the same fluid amplifier 82. That is, for a given Y value, all X values relate to the same fluid amplifier. There may be 40 of such X values to one amplifier. Further, for a given X value, each Y value relates to a different fluid amplifier. There may be 12 such Y values. This X, Y arrangement makes possible a great many information bits or combinations.

FIGURES XXVIII, XXIX and XXX illustrate an alternative system. This system provides potentially a great increase in information units. It has the effect, from the same 12 line by 40 line punch-card, of producing a 24 line by 40 line punch-card. The punch-card is used as in two halves, left and right, with the left half having potentially 12 hole verticals for process control, and the right half having the top as an 8 hole vertical section for process, and the bottom as a 4 hole vertical section for time signals.

FIGURE XXIX illustrates the fluid input distributor plate wherein the stepping wheel is provided with a rotating diameter with an output at each end instead of the single radius input previously shown. Thus two scan steps are taken for each step of rotation of the wheel.

The output pattern is schematically shown in FIGURE XXX where each half of the simultaneous double operation is directed to a different fluid amplifier as at 84 and 85, see also FIGURE XXVIII. With this arrangement thinner output plates may be used because even though the output channels are smaller, the restriction is cut down because many of the output passages are shorter than before. There are still 40 scan steps, but each one covers two independent vertical line punch-card hole areas.

The terms "isolated gating," "without feedback," and "cross-contamination" all are intended to specify that each signal is individual and has no effect on other signals in the various other passages in this device. "Isolated gating" simply means that this individual character of each signal extends to and through the amplifiers at the ends of the readout passages. Thus "without cross-contamination" is achieved in the amplifier section by the "isolated gating" nature of the amplifiers.

The terms "without feedback" means that no effect from one single signal system has any way of feeding back to affect any other signal within the readout system.

The "diffusion amplifier" is one wherein a fluid laminar stream in free flow across an open space is diffused by a transverse fluid signal contact, to a point of effective zero output from the amplifier.

"Gated amplifier" refers to the on-off nature of the diffusion amplifier, and "fluid isolated gating effect" refers to the individuality of the amplifiers, in that the operation of one does not affect others in the amplifier group.

This invention, therefore, provides a new and useful fluid information system with no moving parts associated directly with the information matrix such as a punch-card, on an isolated gating basis with no feedback and no signal cross-contamination. It further provides a special X, Y matrix concept of output application whereby many information units are provided in compact fashion. It further provides a fluid information system wherein system output is used as feedback to initiate system scanning operation.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

We claim:

1. A fluid system for reading an information matrix of fluid passages comprising, a fluid output system of readout passages for fixed output operating relation to said information matrix in the sense of being without relative movement with respect thereto, each of said readout passages being individual to one of said matrix passages, on an isolated gating basis, without feedback and without cross-contamination between said readout passages, means responsive to output signals from said readout passages for producing operating signals representative of the information in said information matrix, and means for fluid input scanning said information matrix to initiate said output signals by directing fluid through said passages in said information matrix, said means for fluid scanning comprising a series of input passages for fixed application to one side of said information matrix, and means for sequentially directing fluid to said input passages.

2. A fluid information system according to claim 1, wherein said fluid output system comprises a sandwich of readout plates corresponding in number to the number of fluid passages in one direction in said matrix.

3. A fluid information system according to claim 1, wherein said means responsive to output signals includes a gated amplifier in the form of a fluid diffusion amplifier to which output signals are directed from selected ones of said readout passages, to a number corresponding to the number of fluid passages in one direction in said matrix.

4. A fluid information system according to claim 1, wherein said information matrix is a punch-card, and said means responsive to output signals is fluid amplifier means.

5. A fluid information system according to claim 1, wherein said means responsive to output signals is a system of fluid diffusion amplifiers.

6. A fluid information system according to claim 1, wherein said information matrix is a punch-card with a section devoted to signals to be fed to a timer, and a section devoted to signals to be fed to process control means.

7. A fluid information system according to claim 1, wherein said fluid scanning means is a multiple simultaneous scan system, and wherein said means responsive to output signals comprises multiple output receiving systems, each respectively individual to one of said multiple scanning systems.

8. A fluid information system according to claim 1, wherein a body of said fluid scanning means and said body of said fluid output system are movable with respect to each other to receive, align and clamp between them said information matrix as a body whereby all three bodies are fixed with respect to each other during the scan and readout operation of said information system.

9. A fluid system for reading an information matrix of fluid passages comprising, a fluid output system of readout passages for fixed output operating relation to said information matrix in the sense of being without relative movement with respect thereto, each of said readout passages being individual to one of said matrix passages, on an isolated gating basis, without feedback and without cross-contamination between said readout passages, means responsive to output signals from said readout passages for producing operating signals representative of the information in said information matrix, and means for fluid input scanning said information matrix to initiate said output signals by directing fluid through said passages in said information matrix, said information matrix having a first given number of potential fluid passages in one direction and a second given number in another direction, said output passages individually contained in output passage plates to the same number as said first given number of matrix passages, and said means responsive to output signals comprising units to the same number as said second given number of potential matrix passages, whereby at any operative point of said scanning a single one only of said output plates is in signal passage use, and said output signal units are in selective use from none to all, in accordance with the actual fluid passages available in said information matrix at said scan point and in said second direction.

10. A multiple signal fluid program system based on a fluid isolated gating effect, free of feedback and cross-contamination, wherein signal program pattern means is fixed with respect to readout passages conforming to said pattern, one one side thereof, with means on the other side of said pattern means for scan traversing said pattern through sequential application of a fluid stream to a series of elongate channels, each in fixed relation to said pattern and each open to a different elongate area of said pattern, a series of fluid amplifiers operable simultaneously according to the readout from one at a time of said elongate pattern areas, and operable sequentially in patterns according to the pattern in said elongate pattern areas, and said readout passages being placed for application of signals in said readout passages as control signals for said fluid amplifiers, whereby said scan traversing of said pattern produces a series of binary signal combinations in the outputs of said fluid amplifiers, said combinations being representative one at a time of those portions of said patterns which are included in said elongate input channels.

References Cited

UNITED STATES PATENTS

| | | |
|---|---|---|
| 3,114,035 | 12/1963 | Avery. |
| 3,226,530 | 12/1965 | Greenblott et al. |
| 3,241,668 | 3/1966 | Schonfeld et al. |

FOREIGN PATENTS

| | | |
|---|---|---|
| 643,299 | 6/1962 | Canada. |

WILLIAM F. O'DEA, Primary Examiner

R. G. NILSON, Assistant Examiner

U.S. Cl. X.R.

137—624.2; 235—61.11